(12) United States Patent
Baba

(10) Patent No.: US 7,536,917 B2
(45) Date of Patent: May 26, 2009

(54) PRESSURE SENSOR

(75) Inventor: Hironobu Baba, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/007,913

(22) Filed: Jan. 17, 2008

(65) Prior Publication Data

US 2008/0190209 A1 Aug. 14, 2008

(30) Foreign Application Priority Data

Feb. 14, 2007 (JP) ............................. 2007-033507

(51) Int. Cl.
*G01L 9/00* (2006.01)
(52) U.S. Cl. .......................................... 73/754; 73/756
(58) Field of Classification Search .................. 73/754, 73/756
See application file for complete search history.

(56) References Cited

U.S. PATENT DOCUMENTS 6,070,469 A * 6/2000 Taniguchi et al. ............. 73/720
6,651,508 B2   11/2003 Baba et al.
2006/0288793 A1 * 12/2006 Tanaka ......................... 73/754
2008/0000302 A1 *  1/2008 Ueno ............................ 73/717

FOREIGN PATENT DOCUMENTS

JP   A-10-332506   12/1998
JP   A-11-132885    5/1999

* cited by examiner

*Primary Examiner*—Andre J Allen
(74) *Attorney, Agent, or Firm*—Posz Law Group, PLC

(57) ABSTRACT

A pressure sensor comprises: a case body including a pressure introduction port; a sensor chip including a top surface, a bottom surface, a sensing member disposed on the top surface and a concave member disposed on the bottom surface; a ceramic substrate including a front surface, a rear surface, a front opening disposed on the front surface and a rear opening disposed on the rear surface; and the gel member. The sensor chip is disposed on the front opening. The case body accommodates the ceramic substrate. The rear opening is coupled with the port. The gel member is disposed in the front and rear openings, and covers the concave member. The concave member receives a pressure of a pressure medium, which is introduced in the port, via the gel member. The sensing member detects the pressure.

10 Claims, 3 Drawing Sheets

PRESSURE SENSOR

CROSS REFERENCE TO RELATED APPLICATION

The present application is based on and claims priority to Japanese Patent Application No. 2007-33507 filed on Feb. 14, 2007, the disclosure of which is incorporated herein by reference.

FIELD OF THE INVENTION

The present invention relates to a pressure sensor.

BACKGROUND OF THE INVENTION

A diesel particulate filter (DPF) system cleans up an exhaust gas emitted by an engine. The DPF system typically includes a pressure sensor that detects a pressure difference of an emitted exhaust gas between before and after passing through a DPF. The DPF works as a filter, and the pressure sensor is used for checking, for example, an occurrence of a DPF clogging. A pressure sensor like the above-described sensor may be used in a pressure medium such as the exhaust gas having high corrosive property. Thus, a sensor structure is important to protect a sensor chip against a corrosive pressure medium. The sensor chip detects the pressure.

A pressure sensor structure is taught in U.S. Pat. No. 6,651,508. The pressure sensor includes a gel for protecting a sensor chip of the pressure sensor. More specifically, the pressure sensor comprises a resin casing. The resin casing includes a pressure introduction port having a first pressure introduction passage and a second pressure introduction passage. The first pressure introduction passage and the second pressure introduction passage introduce a pressure medium therein. The pressure sensor further comprises a semiconductor diaphragm-type sensor chip. The chip is a plate shaped sensing member having a first surface and a second surface. The first surface of the sensing member receives the pressure of the pressure medium introduced in the first pressure introduction passage. The second surface of the sensing member receives the pressure of the pressure medium introduced in the second pressure introduction passage. The difference of the pressures applied to the first surface and the second surface can be measured.

A pressure sensor like the above-described sensor includes a glass substrate having a first through-hole. The resin casing has a second though-hole. The resin casing is bonded to the glass substrate. The resin casing is connected to the first though-hole of the glass substrate. Further, the second surface of the sensor chip is bonded to the glass substrate. When the sensor chip has a dimensions, for example, 3 mm square, the size of each through-hole is given as, for example, 1.25 mm.

A first protecting member is disposed on the first surface of the sensor chip. A second protecting member is disposed in the first and second though-holes. Material of the first and second protecting members is gel that can protect the sensor chip against the pressure medium having a corrosive property.

Since the second surface of the sensor chip is covered by the gel, the resin casing needs to have the second though-hole for disposing the gel therein. In view of strength of the resin casing, it is considered that thickness of the resin casing is, for example, at least 1 mm.

In view of the above-described case, the present inventor has clarified that there arise following problems.

FIG. 3 illustrates a pressure sensor according to a related art. A sensor chip 92 is coupled with a resin casing 93 via a base 91, and a second surface receives a pressure of a pressure medium. The resin casing 93 includes a third through-hole 94 having a hole size φ, e.g. a hole diameter, and a hole length t. The hole length t is, for example, a distance between an end of the third though-hole 94 and the second surface of the sensor chip 92, as shown in FIG. 3. FIG. 4 shows a relation between a bending ratio of a temperature characteristic and φ/t. The bending ratio of a temperature characteristic is also referred to herein as BRC.

The BRC expresses a sensor characteristics difference between following two cases in a low temperature region; one case is that a gel member 95 covers the second surface of the sensor chip 92 with a penetration degree of 120, and the other case is that the gel member 95 does not cover the second surface of the sensor chip 92. The penetration degree associates with hardness of the gel member 95. For example, when the penetration degree is 100, the gel member 95 is soft. When the penetration degree is 40, the gel member 95 is very hard for example.

As shown in FIG. 4, as φ/t is larger or as a diameter of the third though-hole 94 is larger, the BRC is smaller, and the sensor has a better characteristic. However, as, as φ/t is smaller or as the diameter of the third though-hole 94 is smaller, the BRC is larger, and the sensor has a worse characteristic. As described above, when the resin casing 93 includes the third though-hole 94, the resin casing 93 needs to have a thickness enough to ensure the strength of the resin casing 93. Since the hole size of the though-hole is inevitably smaller than a size of the chip sensor 92, it is likely that a pressure sensor is designed such that third though-hole 94 has a smaller diameter than the length of the third though-hole 94. Therefore, there arises a problem that the BRC is large and a characteristic error of the sensor chip 92 is large, as shown in FIG. 4.

It is considered that the third though-hole 94 is sealed with using the gel member 95 made of soft material. FIG. 5 is a graph showing a relation between the gel hardness and a deviation before and after gel inserting. The deviation before and after gel inserting indicates a degree of a sensor characteristic deviation. Specifically, as the deviation before and after gel insert is closer to 0%, the sensor has fewer characteristic deviation. As the deviation before and after gel insert has a larger value, the sensor has larger characteristic deviation, which corresponds to the sensor having a worse characteristic.

As shown in FIG. 5, as the gel member 95 is harder, the sensor has larger characteristic deviation corresponding to the sensor having a worse characteristic. However, as the gel member 95 is softer, the sensor has smaller characteristic deviation, which corresponds to the sensor characteristics being not influenced.

The resin casing 93 has a rough surface caused by a filler such as that made of glass included in the resin casing 93 and caused by a formation condition of the resin casing 93. Thus, there arises a condition that an air bubble can be attached to a surface of the resin casing 93. When the gel member 95 made of the soft material is applied to the resin casing 93 in the condition as described-above, the air bubble penetrates an inner potion of the gel member 95. There arises a problem that the air bubble prevents from transmitting a pressure, and thereby a worse sensor characteristic is caused.

Further, there arise problems that a thermal expansion coefficient difference between the gel member 95 and the resin casing 93 causes the generation of stress, and that the gel member may peel off from the resin casing 93. In the above-described case, the emitted exhaust gas having the corrosive property may penetrate a boundary or a space between the gel member 95 and the resin casing 93. The emitted exhaust gas may decompose the gel member 95 and the resin casing 93.

SUMMARY OF THE INVENTION

In view of the above-described problem, it would desirable for a pressure sensor in which the peeling off of a gel member is prevented. It would also desirable for a pressure sensor in which the generation of an air bubble is suppressed.

In view of the above-described problem, it is an object of the present disclosure to provide a pressure sensor.

According to a first aspect of the present disclosure, a pressure sensor for detecting a pressure of a pressure medium, the pressure sensor comprises: a case body having a box shape and including a pressure introduction port for introducing the pressure medium therein; a sensor chip having a plate shape and including a top surface and a bottom surface opposite to the top surface, wherein the sensor chip further includes a sensing member disposed on the top surface of the sensor chip and a concave member disposed on the bottom surface of the sensor chip, and wherein the concave member has a concave portion; a ceramic substrate having a plate shape and including a front surface and a rear surface opposite to the front surface, wherein the ceramic substrate further includes a front opening disposed on the front surface of the ceramic substrate and a rear opening disposed on the rear surface of the ceramic substrate, and wherein the front opening is spatially coupled with the rear opening across the ceramic substrate; and a gel member. The sensor chip is disposed on the front surface of the ceramic substrate such that the concave member of the sensor chip is disposed on the front opening. The case body accommodates the ceramic substrate such that the rear opening of the ceramic substrate is coupled with the pressure introduction port. The gel member is disposed in the front opening and the rear opening, and covers the concave member of the sensor chip. The concave member of the sensor chip receives the pressure of the pressure medium via the gel member, the pressure medium introduced in the pressure introduction port. The sensing member of the sensor chip detects the pressure of the pressure medium.

According to the above pressure sensor, the ceramic substrate has a regular, stable surface. The air bubble is not substantially attached to a surface of the ceramic substrate before the gel member is disposed in the openings. The penetrating of the air bubble into the gel member can be prevented. The gel member can be prevented from peeling off.

According to a second aspect of the present disclosure, a pressure sensor for detecting a pressure of a pressure medium, the pressure sensor comprises: a case body having a box shape and including a first pressure introduction port and a second pressure introduction port for introducing the pressure medium therein; a plurality of sensor chips including: a first sensor chip having a plate shape and including a first top surface and a first bottom surface opposite to the first top surface, wherein the first sensor chip further includes a first sensing member disposed on the first top surface of the first sensor chip and a first concave member disposed on the first bottom surface of the first sensor chip, and wherein the first concave member has a first concave portion; and a second sensor chip having a plate shape and including a second top surface and a second bottom surface opposite to the second top surface, wherein the second sensor chip further includes a second sensing member disposed on the second top surface of the second sensor chip and a second concave member disposed on the second bottom surface of the second sensor chip, and wherein the second concave member has a second concave portion; a ceramic substrate having a plate shape and including a front surface and a rear surface opposite to the front surface, wherein the ceramic substrate further includes a plurality of pairs of openings, the plurality of pairs of openings including: a first pair of openings having a first front opening disposed on the front surface of the ceramic substrate and a first rear opening disposed on the rear surface of the ceramic substrate, wherein the first front opening is spatially coupled with the first rear opening across the ceramic substrate; and a second pair of openings having a second front opening disposed on the front surface of the ceramic substrate and a second rear opening disposed on the rear surface of the ceramic substrate, wherein the second front opening is spatially coupled with the second rear opening across the ceramic substrate; a gel member; and a circuit chip. The first sensor chip is disposed on the front surface of the ceramic substrate such that the first concave member of the first sensor chip is disposed on the first front opening. The second sensor chip is disposed on the front surface of the ceramic substrate such that the second concave member of the second sensor chip is disposed on the second front opening. The case body accommodates the ceramic substrate such that the first rear opening of the ceramic substrate is coupled with the first pressure introduction port, and such that the second rear opening of the ceramic substrate is coupled with the second pressure introduction port. The gel member is disposed in the first front opening, the second front opening, the first rear opening and the second rear opening, and covers the first concave member of the first sensor chip and the second concave member of the second sensor chip. The circuit chip is electrically coupled with the first sensor chip and the second sensor chip. The first concave member of the first sensor chip receives the pressure of the pressure medium via the gel member, the pressure medium introduced in the first pressure introduction port. The first sensing member of the first sensor chip detects the pressure of the pressure medium, the pressure medium introduced in the first pressure introduction port. The second concave member of the second sensor chip receives the pressure of the pressure medium via the gel member, the pressure medium introduced in the second pressure introduction port. The second sensing member of the second sensor chip detects the pressure of the pressure medium, the pressure medium introduced in the second pressure introduction port. The circuit chip calculates a differential pressure between the pressure detected by the first sensor chip and the pressure detected by the second sensor chip. The number of the plurality of pairs of openings corresponds to the number of the plurality of sensor chips.

According to the above pressure sensor, the ceramic substrate has a regular, stable surface. The air bubble is not substantially attached to a surface of the ceramic substrate before the gel member is disposed in the openings and is disposed on the sensor chips. The penetrating of the air bubble into the gel member can be prevented. The gel member can be prevented from peeling off. A detection characteristic of the pressure sensor is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A pressure sensor according to the present embodiment may be used with, for example, a diesel particulate filter (DPF) system that cleans up an exhaust gas emitted by an engine. The pressure sensor may be used for detecting a pressure difference of an emitted exhaust gas between before and after passing through the DPF, and the pressure sensor may be used for checking an occurrence of a DPF clogging.

Figure 1:
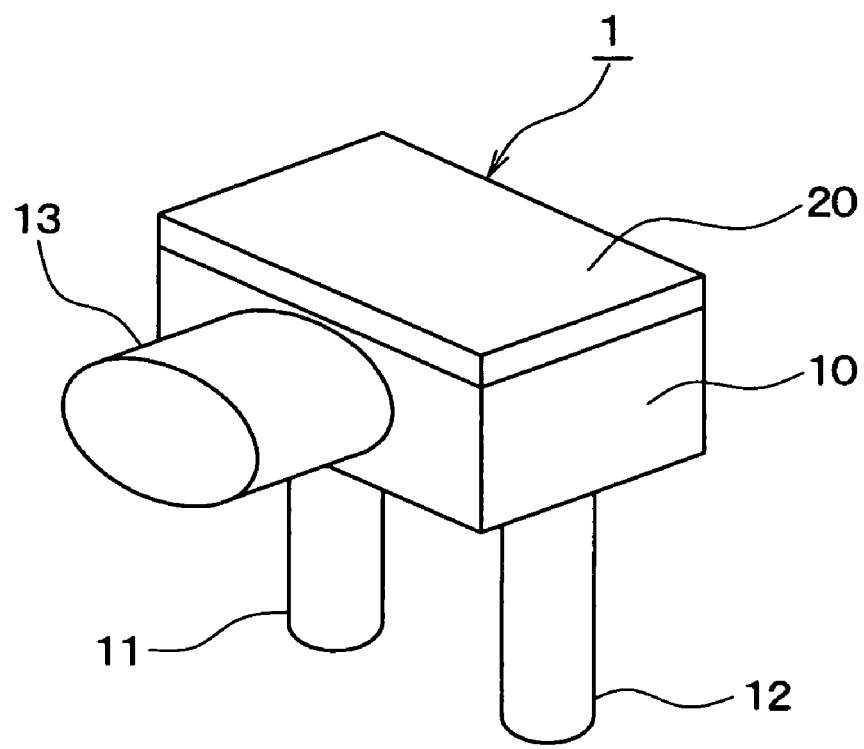
FIG. 1 is a perspective view of a pressure sensor according to a first embodiment of the present invention.

The pressure sensor includes a case body 10 and a lid member 20, for example as shown in FIG. 1. The case body 10 has a box shape, and the lid member 20 is a lid of the case body 10. The case body 10 and the lid member 20 may be made by means of a molding method. Material of the case body 10 and the lid member 20 is, for example, resin such as polyphenylene sulfide (PPS), polybutylene terephthalate (PBT) and epoxy resin and the like.

The case body 10 includes a first pressure introduction port 11 and a second pressure introduction port 12. The first pressure introduction port 11 and the second pressure introduction port 12 are disposed on a rear surface of the case body 10. Each port 11, 12 has an inside space which is spatially connected to an inside space of the case body 10. Among the ports 11, 12, one of them is located on an upstream side of the DPF, and the other is located on a downstream side of the DPF.

The case body 10 includes a connector member 13 disposed on a side surface of the case body 10. The connector member 13 has a concave portion. The connector member 13 outputs a signal to outside, the signal which includes information on a pressure value detected in the pressure sensor 1. The connector member 13 is electrically connected with, for example, an external circuit such as an external electronic control unit or an external engine control unit, any of which is referred to herein as ECU, via a line such as a wiring harness (not shown in FIGS).

Figure 2A:
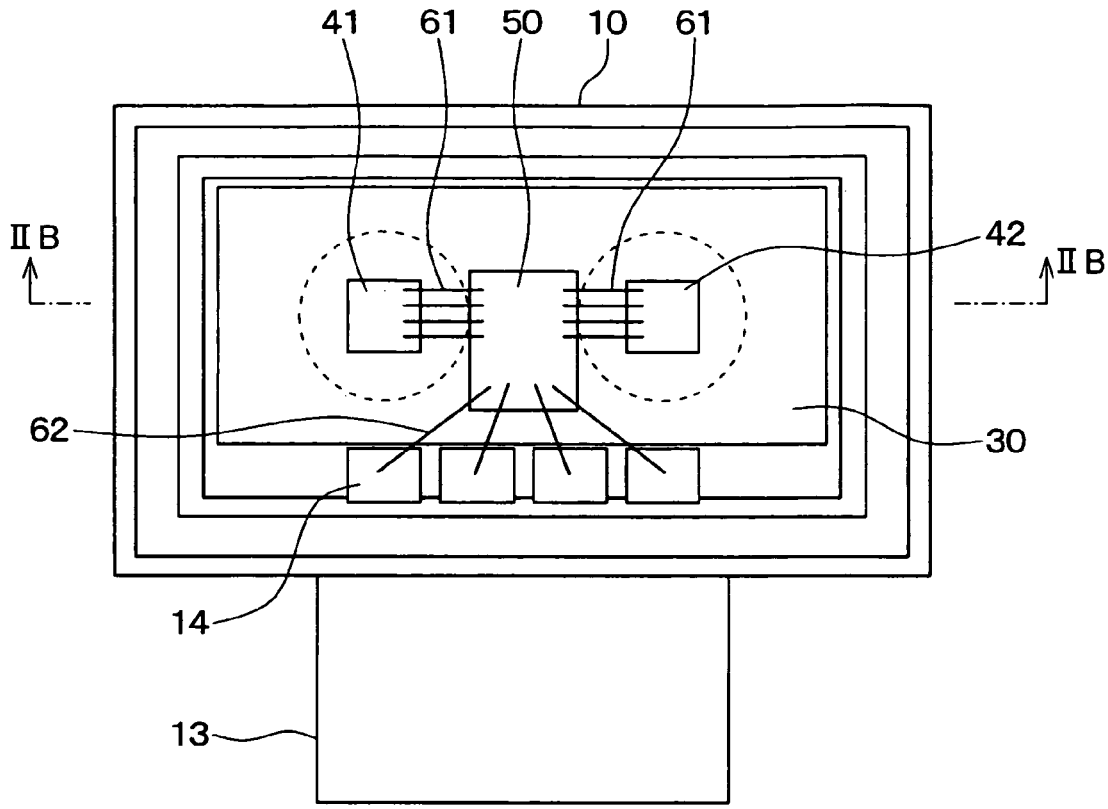
FIG. 2A is a top view of a pressure sensor without a lid member.

A ceramic substrate 30 is disposed in the case body 10, for example as shown in FIG. 2A. Material of the ceramic substrate 30 is, for example, alumina. The ceramic substrate 30 made of alumina has a larger strength than a printed substrate made of resin and has a smaller thermal aging characteristic than the printed substrate. A first sensor chip 41, a second sensor chip 42, and a circuit chip 50 are disposed on a front surface of the ceramic substrate 31, the surface which faces the lid member 20. The circuit chip 50 is disposed between the first sensor chip 41 and the second sensor chip 42. The circuit chip 50 is electrically connected to the first sensor chip 41 and second sensor chip 42 via a first bonding wire 61.

Each chip 41, 42 detects a pressure of a pressure medium and outputs an electric signal, a level of which is associated with a detected pressure value. Each chip 41, 42 exploits a piezoresistance effect to detect the pressure. In the present embodiment, the first and second sensor chip 41, 42 has a sensing member for detecting a voltage. Specifically, each chip 41, 42 includes a diaphragm and a sensing member. Each diaphragm is a strain member. Each sensing member has a bridged circuit disposed on the diaphragm. The sensing member includes, for example, a diffused resistor. Each size of the first sensor chip 41 and second sensor chip 42 adopted in the present embodiment is, for example, 3.0 mm square.

The circuit chip 50 includes a controller circuit etc. Functions of the circuit chip 50 include an output of a drive signal to each chip 41, 42, an output of a detection signal to the outside, and an output of a signal after performing an arithmetical operation and an amplification operation. The above-described circuit chip 50 may include a silicon substrate on which a Complementary Metal-Oxide Semiconductor (CMOS) transistor and a bipolar transistor are disposed with using a semiconductor process. Alternatively, the circuit chip 50 may be an IC chip. Alternatively, the circuit chip 50 may be configured to be a circuit including a flip chip etc.

The connector member 13 and a terminal 14 are formed in the case body 10 by means of an insert molding. One side of the terminal 14 is exposed to the inside space of the case body 10, and is electrically connected to the circuit chip 50 and a second bonding wire 62. The other side of the terminal 14 is exposed to an inside space of the connector member 13. The terminal 14 is electrically connected to an external circuit such as the ECU via a line when the connector member 13 is connected with an external connector. In the present embodiment, four terminals are formed in the case body 10 by means of the insert molding.

Figure 2B:
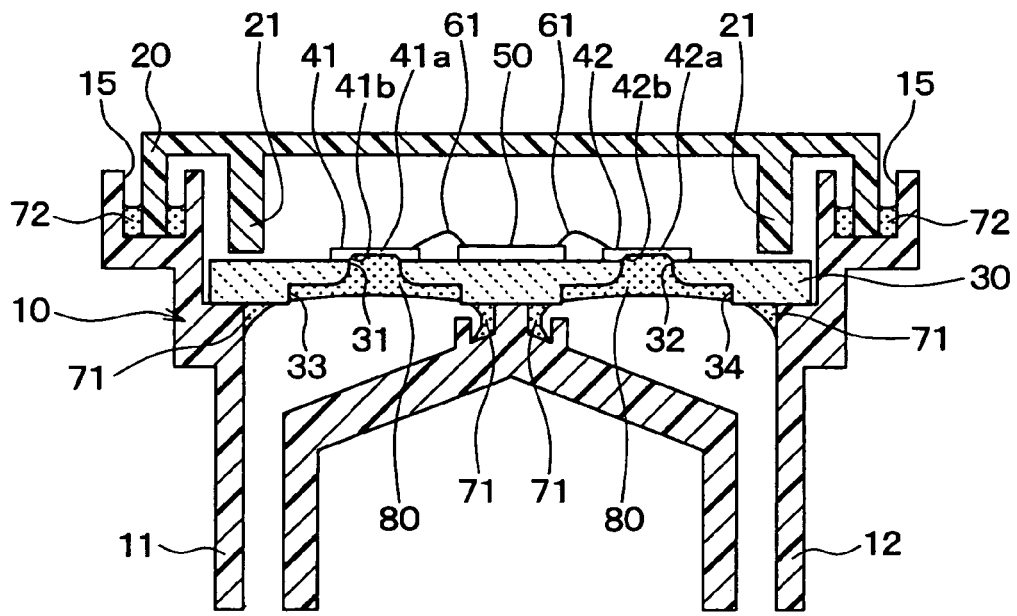
FIG. 2B is a cross sectional view of the pressure sensor, the view being taken along line IIB-IIB in FIG. 2A.

The ceramic substrate 30 is disposed in the inside space of the case body 10 with using a first adhesive member 71, for example as shown in FIG. 2B. One end of each port 11, 12 is covered by the ceramic substrate 30. The inside space of the port 11 is separated from the inside space of the port 12, unless a space outside the pressure sensor is took into account. Pressure mediums are introduced into each other end of each port 11, 12 from the upstream side and the downstream side of the DPF, respectively.

In the case body 10, the first adhesive member 71 is exposed to the exhaust gas corrosive property, which is introduced into the inside space of each port 11, 12. For the reason described above, material of the first adhesive member 71 is, for example, fluorine or fluorine silicon, which can have resistance properties against a corrosive exhaust gas.

The front surface of the ceramic substrate has a first opening 31 and a second opening 32, the front surface on which the chips 41, 42 are disposed. The diameter of each opening 31, 32 is smaller than the size of each chip 41, 42. Diameters of the first opening 31 and second opening 32 are, for example in a range between 1 mm and 2 mm. Depths of the first opening 31 and second opening 32 are, for example, in a range between 0.5 mm and 0.8 mm. A rear surface of the ceramic substrate has a third opening 33 and a fourth opening 34. The rear surface of the ceramic substrate 30 is opposite to the front surface of the ceramic substrate 30. The third opening 33 and the fourth opening 34 are connected with the first opening 31 and the second opening 32, respectively. Diameters of the third opening 33 and the fourth opening 23 are larger than diameters of the first opening 31 and the second opening 32. Since the ceramic substrate 30 has at least two opening such as the openings 31-34, the ceramic substrate 30 has at least one passage penetrates the substrate 30, for example, in the thickness direction. The opening 31, 32 disposed on the front surface is also referred to herein as a front opening 31, 32. The opening 33, 34 disposed on the rear surface is also referred to herein as a rear opening 33, 34.

The first sensor chip 41 includes a first top surface and a first bottom surface. The second sensor chip 42 includes a second top surface and a second bottom surface. The bottom surface of each chip 41, 42 has a concave shape. The first sensor chip 41 and the second sensor chip 42 include a first diaphragm 41A and a second diaphragm 42A, respectively. The first diaphragm 41A and the second diaphragm 42A are disposed on each top surface of each chips 41, 42. The diaphragms 41A, 42A are thin-walled members and strain members. The first sensor chip 41 and the second sensor chip 42, respectively, include a first concave member 41B and a second concave member 42B. The first concave member 41B and the second concave member 42B are disposed on the first bottom surface and the second bottom surface, respectively. Each of the first concave member 41B and the second concave member 42B has a concave portion. The members 41B, 42B are formed by an anisotropic etching so that the diaphragms 41A, 42A are configured to be disposed on the top surface of the chips 41, 42. In other words, each chip 41, 42 has the concave member disposed on each bottom surface of the chips 41, 42, and each chip 41, 42 has the diaphragm disposed on each top surface of the chips 41, 42. Each diaphragms 41A, 42A is a strain member associated with each concave member 41B, 42B. The diaphragms 41A, 42A is also referred to herein as a sensing member 41A, 42A.

The first sensor chip 41 and the second sensor chip 42 are disposed on the ceramic substrate 30 such that the members 41B, 42B face the openings 31, 32. Since the chips 41, 42 are disposed on the ceramic substrate 30, the bottom surface of each chip 41, 42 may be exposed to the pressure medium. The sensor 1 may be used in a severe environment. For example, when the pressure sensor 1 is used for the DPF, the bottom surface of each chip 41, 42 is exposed to the exhaust gas having the corrosive property. For the reason described above, a circuit and the like are not disposed on the bottom surfaces of the chips 41, 42.

Furthermore, in the present embodiment, a gel member 80 is disposed in the openings 31, 32 and the openings 33, 34, and the gel member 80 covers the bottom surface of each chip 41, 42. Material of the gel member 80 is, for example, fluorine or fluorine silicon, which can have a resistance characteristic against the exhaust gas having corrosive property. The gel member 80 is capable of protecting the bottom surface of each chip 41, 42.

A groove 15 is disposed on an apertural area of the case body 10. A second adhesive member 72 is sealed in the groove 15. The case body 10 is combined with the lid member 20.

A protruding member 21 is disposed on a surface of the lid member 20, the surface which faces the case body 10. The protruding member 21 prevents from peeling off the ceramic substrate 30 from the case body 10 when an excess pressure is applied to the ceramic substrate 30, and when the lid member 20 is combined with the case body 10. The member 21 has a float prevention function.

An example of a method for manufacturing the pressure sensor is explained below. The ceramic substrate 30 having a plate shape, the chips 41, 42 configured to have the sensing members, the circuit chip 50, the lid member 20 having the protruding member 21, and the case body 10 are prepared. The case body 10 having the connector member 13, the first pressure introduction port 11, the second pressure introduction port 12 and the terminal 14 that are formed by the insert molding is prepared. The case body 10 may be formed by the insert molding.

The first opening 31 and the second opening 32 are formed on the top surface of the ceramic substrate 30, where the first opening 31 and the second opening 32 are small than the first sensor chip 41 and the second sensor chip 42. The third opening 33 and the fourth opening 34 are formed on the rear surface of the ceramic substrate 30. The openings 33, 34 are configured to be connected with the openings 31, 32. The openings 33, 34 are configured to be larger than the openings 31, 32.

The first sensor chips 41, the second sensor chip 42 and the circuit chip 50 are bonded and fixed to the front surface of the ceramic substrate 30 such that The concaved bottom surfaces of the chips 41, 42 are configured to face the opening 31, 32. Further, the circuit chip 50 is disposed between the first sensor chip 41 and the second sensor chip 42.

The circuit chip 50 is configured to be coupled with each chip 41, 42 by means of a wire bonding. Each of the chips 41, 42 is electrically connected with the circuit chip 50 through the bonding wire 61. The gel member 80 is disposed in the openings 31-34 and covers the concave portion of the bottom surface of each chip 41, 42. Fluorine or fluorine silicon is used for material of the gel member 80. Fluorine or fluorine silicon has a resistance characteristic against the exhaust gas having the corrosive property.

After disposing the gel member 80, characteristics of the chips 41, 42 are adjusted. Then, the ceramic substrate 30 is bonded to the case body 10 via the first adhesive member 71. Fluorine or fluorine silicon is used for material of the first adhesive member 71. Fluorine or fluorine silicon has a resistance characteristic against the exhaust gas having the corrosive property.

One end of the terminal 14 is coupled with the circuit chip 50 by means of a wire bonding, the one end which is exposed to the inside space of the case body 10. The terminal 14 is electrically connected to the circuit chip 50 via the second bonding wire 62.

The second adhesive member 72 is poured in the groove 15 of the case body 15. The case body 10 is combined with the lid member 20 via the second adhesive member 72 by inserting the open end of the lid member 20 in the groove 15. The above-described manner can complete a pressure sensor 1.

A method for detecting the pressure is explained below.

When the pressure sensor 1 is applied to the DPF system, one of the ports 11, 12 is coupled with an exhaust pipe located on the upstream side of the DPS, and the other of the ports 11, 12 is coupled with another exhaust pipe located on the downstream side of the DPS. The pressure mediums located on the upstream side and the downstream side of the DPF are introduced into the ports 11, 12, respectively.

The sensing member of each chip 41, 42 detects the pressure of the pressure medium via the gel member 80. A voltage signal having information on the detected pressure is outputs to the circuit chip 50. The openings 33, 34 have larger receiving surfaces than the openings 31, 32. Thus, when a foreign particle transferred to the inside space of the port 11 or 12 is attached to the gel member 80, the influence of the particle with respect to the pressure transmission is reduced. The foreign particle does not influence the pressure detection, substantially.

The circuit chip 50 performs an arithmetic operation such as a differential pressure calculation and amplification operation based on the voltage signals from the chips 41, 42. The circuit chip 50 outputs a differential pressure signal to the ECU through the terminal 40, the ECU which controls the DPF system. In the above-described manner, the pressure difference of the pressure mediums introduced from the upstream side and the downstream side is measured. If the excess pressure is applied to the ceramic substrate 30, the protruding member 21 prevents from peeling off the ceramic substrate 30 from the case body 10. The protruding member 21 is disposed on a portion of the lid member, the portion which faces a periphery of the ceramic substrate 30.

The pressure sensor according to the present embodiment includes following characteristics. The chips 41, 42 are disposed on the ceramic substrate 30. The gel member 80 is disposed in the openings 31-34 in order to protect the bottom surfaces of the first and second sensor chip 41, 42.

The ceramic substrate 30 has a regular, stable surface. On the other hand, the resin casing 93 according to the related art may have a rough surface caused by a filler made of, for example, glass, and caused by a formation condition of the resin casing 93. In the present embodiment, an air bubble is not substantially attached to the surface of the ceramic substrate 30 before the gel member 80 is disposed in the openings 31-34. Thus it is possible to prevent from penetrating the air bubble into the gel member 80 even if the gel member 80 is disposed in the openings 31-34. As a result, following problems are eliminated; the air bubble prevents from transmitting the pressure, and the air bubble worsens the sensor characteristics. The ceramic substrate 30 may be formed from heat-treated material.

The ceramic substrate 30 has a large strength and a less thermal aging property compared to that made of resin. It is possible to reduce the thickness of the openings 31, 32, and reduce an amount of the gel member 80 to be disposed. The sensor characteristics are improved.

A thermal expansion coefficient or a thermal expansion volume of the ceramic substrate 30 is similar to that of the chips 41, 42. Since the stress caused by the difference of the thermal expansion coefficient or the thermal expansion volume between the ceramic substrate 30 and the chips 41, 42 causes the gel member 80 to be peeled off from the ceramic substrate 30, the gel member 80 is prevented from peeling off. Since the gel member 80 is prevented from peeling off, the pressure medium such as the high corrosive exhaust gas is prevented from penetrating into a space between the gel member 80 and the ceramic substrate 30. Accordingly, the decomposition of the gel member 80 and the ceramic substrate 30 is prevented.

Figure 3:
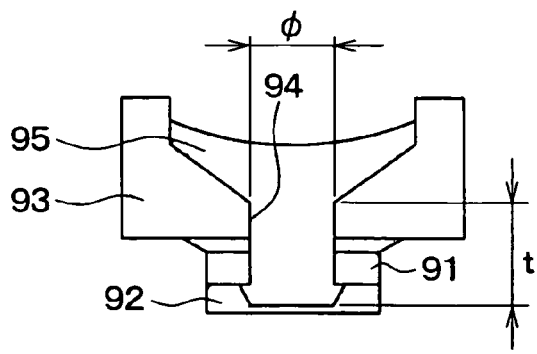
FIG. 3 is a cross sectional view of a pressure sensor according to a related art.

A pressure sensor according to a related art includes a glass base 91 in order to suppress an influence of the thermal expansion coefficient difference, for example as shown in FIG. 3. The pressure sensor 1 according to the present embodiment dose not always require a substrate like the glass base 91 since the pressure sensor 1 dose not have the problem associated with the thermal expansion coefficient difference between the ceramic substrate 30 and the chips 41, 42.

Figure 4:
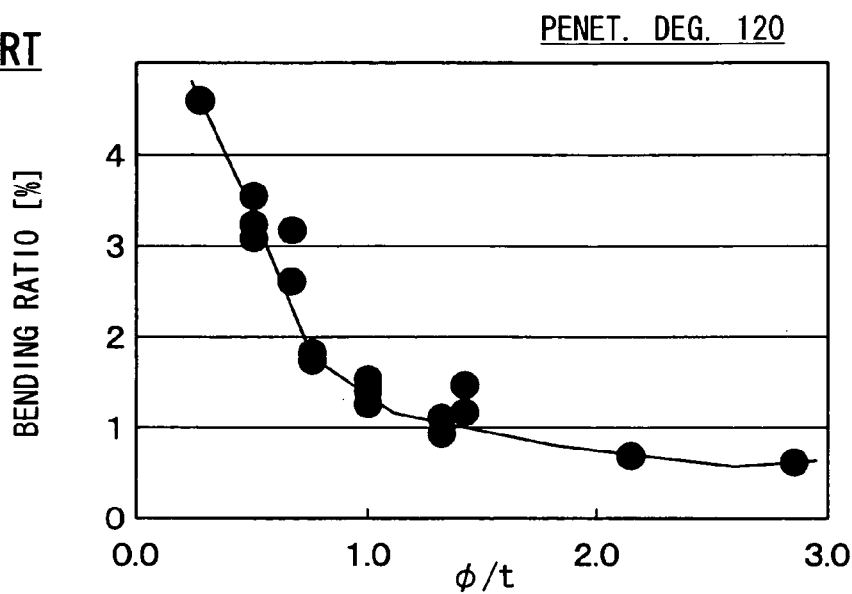
FIG. 4 is a graph illustrating a relation between a ratio $\phi/t$ of a hole size to a hole length and a bending ratio of a temperature characteristic according to the related art.
Figure 5:
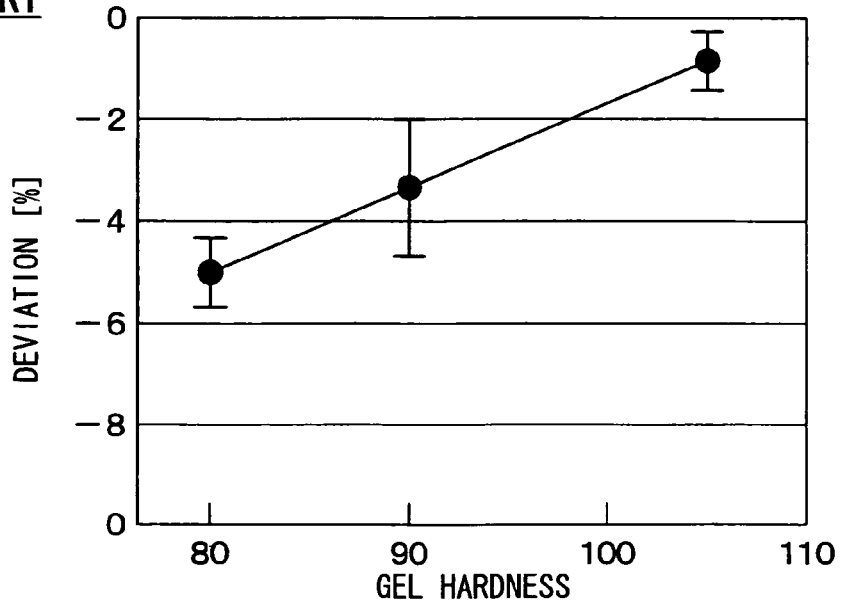
FIG. 5 is a graph illustrating a relation between the gel hardness and a deviation before and after the gel penetration according to the related art.

Further, in the pressure sensor according to a related art, for example as shown in FIG. 4, unless the sensor chip 92 is mounted to the resin casing 93 via the glass base 93, the gel member 95 can not be disposed. Moreover, according to a related art, unless the sensor chip 92 is mounted to the resin casing 93, characteristics of the sensor chip 92 can not be adjusted. In the present embodiment, however, the first sensor chip 41 and the second sensor chip 42 can be directly mounted on the ceramic substrate 30, and the gel member 80 can be directly disposed. In the present embodiment, the chips 41, 42 may not be directly mounted to the case body 10. The characteristics adjustment of the chips 41, 42 and the electrical treatment of the chips 41, 42 can be performed with using the ceramic substrate 30, according to the present embodiment. The ceramic substrate 30 may be smaller than the case body 10.

One of functions of the ceramic substrate 30 is to provide a location for mounting the chips 41, 42 and disposing the gel member 80. Since a printed wire needs not to be printed on the ceramic substrate 30, a manufacturing cost can be reduced. The printed wire needs to be printed when a hybrid substrate is used.

Other Embodiment

In the first embodiment, the differential pressure is measured with using at least the two chips 41, 42. Alternatively, the pressure sensor may include at least one sensor chip for measuring an absolute pressure.

In the first embodiment, the chips 41, 42 are directly disposed on the ceramic substrate 30. Alternatively, the chips 41, 42 may be disposed on the ceramic substrate 30 via a glass substrate.

In the first embodiment, the diameters of the openings 31, 32 are smaller than the diameters of the openings 33, 34. Alternatively, the diameters of the openings 31, 32 may be larger than or equal to the diameters of the openings 33, 34.

In the first embodiment, the pressure sensor 1 is applied to the DPF system for detecting the differential pressure of the pressure mediums located on the upstream side and the downstream side of the DPF system. Alternatively, the pressure sensor 1 may be applied to other apparatus for detecting a differential pressure of gases or an absolute pressure of a gas.

In the first embodiment, the protruding member 21 is disposed on a portion of the lid member 20, the portion which faces a periphery of the ceramic substrate 30. Alternatively, the protruding member 21 may be disposed on a place of the lid member 20, the place which faces a part other than the periphery of the ceramic substrate 30.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A pressure sensor for detecting a pressure of a pressure medium, the pressure sensor comprising:
   a case body having a box shape and including a pressure introduction port for introducing the pressure medium therein;
   a sensor chip having a plate shape and including a top surface and a bottom surface opposite to the top surface, wherein the sensor chip further includes a sensing member disposed on the top surface of the sensor chip and a concave member disposed on the bottom surface of the sensor chip, and wherein the concave member has a concave portion;
   a ceramic substrate having a plate shape and including a front surface and a rear surface opposite to the front surface, wherein the ceramic substrate further includes a front opening disposed on the front surface of the ceramic substrate and a rear opening disposed on the rear surface of the ceramic substrate, and wherein the front opening is spatially coupled with the rear opening across the ceramic substrate;
   a gel member; and
   a lid member, wherein
   the sensor chip is disposed on the front surface of the ceramic substrate such that the concave member of the sensor chip is disposed on the front opening,
   the case body accommodates the ceramic substrate such that the rear opening of the ceramic substrate is coupled with the pressure introduction port,
   the gel member is disposed in the front opening and the rear opening, and covers the concave member of the sensor chip, the concave member of the sensor chip receives the pressure of the pressure medium via the gel member, the pressure medium being introduced in the pressure introduction port, the sensing member of the sensor chip detects the pressure of the pressure medium, the lid member covers the case body such that the lid member opposes the ceramic substrate and such that an inside space of the case body is hermetically sealed with the lid member, and the lid member includes a protruding member disposed on a surface portion of the lid member, and the surface portion faces the ceramic substrate.

2. The pressure sensor according to claim 1, wherein a diameter of the front opening is smaller than a diameter of the rear opening.

3. The pressure sensor according to claim 2, wherein a diameter of the front opening is smaller than a size of the sensor chip.

4. The pressure sensor according to claim 1, wherein, the pressure medium is exhaust gas emitted by an engine of a vehicle.

5. A pressure sensor for detecting a pressure of a pressure medium, the pressure sensor comprising:
   a case body having a box shape and including a first pressure introduction port and a second pressure introduction port for introducing the pressure medium therein;
   a plurality of sensor chips including:
      a first sensor chip having a plate shape and including a first top surface and a first bottom surface opposite to the first top surface, wherein the first sensor chip further includes a first sensing member disposed on the first top surface of the first sensor chip and a first concave member disposed on the first bottom surface of the first sensor chip, and wherein the first concave member has a first concave portion; and
      a second sensor chip having a plate shape and including a second top surface and a second bottom surface opposite to the second top surface, wherein the second sensor chip further includes a second sensing member disposed on the second top surface of the second sensor chip and a second concave member disposed on the second bottom surface of the second sensor chip, and wherein the second concave member has a second concave portion;
   a ceramic substrate having a plate shape and including a front surface and a rear surface opposite to the front surface, wherein the ceramic substrate further includes a plurality of pairs of openings, the plurality of pairs of openings including:
      a first pair of openings having a first front opening disposed on the front surface of the ceramic substrate and a first rear opening disposed on the rear surface of the ceramic substrate, wherein the first front opening is spatially coupled with the first rear opening across the ceramic substrate; and
      a second pair of openings having a second front opening disposed on the front surface of the ceramic substrate and a second rear opening disposed on the rear surface of the ceramic substrate, wherein the second front opening is spatially coupled with the second rear opening across the ceramic substrate;
   a gel member; and
   a circuit chip, wherein the first sensor chip is disposed on the front surface of the ceramic substrate such that the first concave member of the first sensor chip is disposed on the first front opening, the second sensor chip is disposed on the front surface of the ceramic substrate such that the second concave member of the second sensor chip is disposed on the second front opening, the case body accommodates the ceramic substrate such that the first rear opening of the ceramic substrate is coupled with the first pressure introduction port, and such that the second rear opening of the ceramic substrate is coupled with the second pressure introduction port, the gel member is disposed in the first front opening, the second front opening, the first rear opening and the second rear opening, and covers the first concave member of the first sensor chip and the second concave member of the second sensor chip, the circuit chip is electrically coupled with the first sensor chip and the second sensor chip, the first concave member of the first sensor chip receives the pressure of the pressure medium via the gel member, the pressure medium being introduced in the first pressure introduction port, the first sensing member of the first sensor chip detects the pressure of the pressure medium, the pressure medium being introduced in the first pressure introduction port, the second concave member of the second sensor chip receives the pressure of the pressure medium via the gel member, the pressure medium being introduced in the second pressure introduction port, the second sensing member of the second sensor chip detects the pressure of the pressure medium, the pressure medium being introduced in the second pressure introduction port, the circuit chip calculates a differential pressure between the pressure detected by the first sensor chip and the pressure detected by the second sensor chip, and the number of the plurality of pairs of openings corresponds to the number of the plurality of sensor chips.

6. The pressure sensor according to claim 5, wherein a diameter of the first front opening and a diameter of the second front opening are smaller than a diameter of the first rear opening and a diameter of the second rear opening.

7. The pressure sensor according to claim 6, wherein a diameter of the first front opening and a diameter of the second front opening are smaller than a size of the first sensor chip and a size of the second sensor chip.

8. The pressure sensor according to claim 5, further comprising: a lid member, wherein
   the lid member covers the case body such that the lid member is disposed on an opposite side of the ceramic substrate and such that an inside space of the case body is hermetically sealed with the lid member, and
   the lid member includes a protruding member that disposed on a surface portion of the lid member, the surface portion facing the ceramic substrate.

9. The pressure sensor according to claim 5, wherein the circuit chip is disposed on the first surface of the ceramic substrate.

10. The pressure sensor according to claim 5, wherein, the pressure medium is exhaust gas emitted by an engine of a vehicle.

* * * * *